(12) United States Patent
Dudar

(10) Patent No.: US 9,546,894 B2
(45) Date of Patent: Jan. 17, 2017

(54) SYSTEM AND METHODS FOR FUEL LEVEL INFERENCE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 14/226,498

(22) Filed: Mar. 26, 2014

(65) Prior Publication Data

US 2015/0276457 A1 Oct. 1, 2015

(51) Int. Cl.
| | |
|---|---|
| *G01F 23/00* | (2006.01) |
| *G01L 1/10* | (2006.01) |
| *G01L 1/04* | (2006.01) |
| *G01L 1/22* | (2006.01) |
| *G01F 23/18* | (2006.01) |
| *G01F 22/02* | (2006.01) |
| *G01F 23/36* | (2006.01) |
| *G01F 25/00* | (2006.01) |
| *B60K 15/03* | (2006.01) |
| *B60K 15/035* | (2006.01) |

(52) U.S. Cl.
CPC .............. *G01F 23/18* (2013.01); *B60K 15/03* (2013.01); *G01F 22/02* (2013.01); *G01F 23/36* (2013.01); *G01F 25/0061* (2013.01); *B60K 15/035* (2013.01); *B60K 2015/0319* (2013.01); *B60K 2015/03217* (2013.01); *B60K 2015/03256* (2013.01); *B60K 2015/03361* (2013.01); *B60K 2015/03514* (2013.01)

(58) Field of Classification Search
None
See application file for complete search history.

(56) References Cited

U.S. PATENT DOCUMENTS

| | | | |
|---|---|---|---|
| 6,282,953 B1 | 9/2001 | Benjey | |
| 6,397,668 B1 | 6/2002 | Davison et al. | |
| 6,907,780 B1 * | 6/2005 | Meagher | G01F 23/18 73/292 |
| 7,251,997 B1 | 8/2007 | Casey | |
| 7,296,600 B2 | 11/2007 | Ferreria et al. | |
| 7,481,105 B2 * | 1/2009 | Schillinger | G01F 23/2962 73/290 B |
| 7,621,178 B2 * | 11/2009 | Perinet | G01F 23/02 73/149 |
| 8,416,090 B2 | 4/2013 | Bucciero | |
| 8,869,610 B2 * | 10/2014 | Liu | B60K 15/03 73/290 R |

(Continued)

OTHER PUBLICATIONS

Dudar, Aed M. et al., "System and Method for Determining Fuel Fill Level," U.S. Appl. No. 14/490,220, filed Sep. 18, 2014, 47 pages.

(Continued)

*Primary Examiner* — Peter Macchiarolo
*Assistant Examiner* — Jermaine Jenkins
(74) *Attorney, Agent, or Firm* — James Dottavio; Alleman Hall McCoy Russell & Tuttle LLP

(57) ABSTRACT

A method for a fuel system, comprising: monitoring a fuel tank pressure during a refueling event; determining a fuel flow rate based on a steady-state portion of the monitored fuel tank pressure; and indicating an amount of fuel added to a fuel tank based on the fuel flow rate. In this way, a fuel tank fill level can be determined following a refueling event, even in a scenario where the fuel level indicator is stuck or malfunctioning.

18 Claims, 5 Drawing Sheets

(56) References Cited

U.S. PATENT DOCUMENTS

| | | | | |
|---|---|---|---|---|
| 2007/0051172 | A1* | 3/2007 | Perinet | G01F 23/02 73/290 R |
| 2010/0236638 | A1* | 9/2010 | Streib | B60K 15/04 137/14 |
| 2011/0010070 | A1 | 1/2011 | Bohr et al. | |
| 2013/0000741 | A1* | 1/2013 | Crary | G01F 23/0023 137/12 |
| 2013/0197777 | A1* | 8/2013 | Sloan | G01F 23/18 701/102 |

OTHER PUBLICATIONS

Dudar, A. et al., "Methods and Systems for Fuel Level Indicators in a Saddle Fuel Tank," U.S. Appl. No. 14/697,172, filed Apr. 27, 2015, 59 pages.

Kataoka, K. et al., "Development of a Noncontact Fuel Level Sensor," SAE Technical Paper No. 891292, Yazaki Corporation, Published Nov. 1, 1989, 8 pages.

Dudar, Aed M. et al., "Systems and Methods for Inferring Fuel Vapor Canister Loading Rate," U.S. Appl. No. 14/606,704, filed Jan. 27, 2015, 43 pages.

Anonymous, "An EVAP Leak Diagnostic Robustness Method for Saddle Tanks Interaction," IPCOM No. 000233165, Published Nov. 27, 2013, 2 pages.

Anonymous, "Fuel Level Indication Correction as a Function of Fuel Tank Pressure, Temperature and Time," IPCOM No. 000234612, Published Jan. 22, 2014, 4 pages.

Anonymous, "ELCM Validation for Fuel Level When Parking on Grade," IPCOM No. 000237128, Published Jun. 4, 2014, 2 pages.

Anonymous, "Determination of Fuel Tank Run Dry by Monitoring Fuel Pressure," IPCOM No. 000237184D, Published Jun. 6, 2014, 2 pages.

\* cited by examiner

SYSTEM AND METHODS FOR FUEL LEVEL INFERENCE

BACKGROUND AND SUMMARY

Accurately determining and indicating the amount of fuel contained within a fuel tank can often be critical for a vehicle operator. The fuel amount may be used to determine when and where the vehicle should be refueled prior to the fuel tank being emptied.

A typical fuel tank utilizes a dedicated fuel level sensor, such as a floating sensor, to determine the amount of fuel remaining in the fuel tank. However, if the floating sensor becomes stuck, malfunctions, or becomes decoupled from the vehicle powertrain control module, the fuel level may become unknown. An in-dash fuel level indicator may provide an inaccurate or indeterminate fuel level to the vehicle operator. This may lead to the vehicle running out of fuel if the fuel level indicator suggests fuel is still remaining in the tank, or may lead to increased operator anxiety stemming from not knowing how much fuel is remaining in the tank.

The inventors herein have recognized the above problems, and have developed systems and methods to at least partially address them. In one example, a method, comprising: indicating a fuel level of a fuel tank based on a steady-state fuel tank pressure during a refueling event. In this way, a rate of fuel flow from a fuel dispenser into a fuel tank may be determined during the refueling event. The fuel flow rate may then be integrated over the duration of the refueling event to determine an amount of fuel added to the fuel tank.

In another example, a method for a fuel system, comprising: monitoring a fuel tank pressure during a refueling event; determining a fuel flow rate based on a steady-state portion of the monitored fuel tank pressure; and indicating an amount of fuel added to a fuel tank based on the fuel flow rate. In this way, a fuel tank fill level can be determined following a refueling event, even in a scenario where the fuel level indicator is stuck or malfunctioning.

In yet another example, a fuel system for a vehicle, comprising: a fuel tank configured to receive and store a liquid fuel; a fuel tank pressure sensor coupled to the fuel tank; and a controller configured with instructions stored in non-transitory memory, that when executed, cause the controller to: determine a fuel tank fill level prior to a refueling event; monitor a fuel tank pressure during a refueling event; determine a steady-state fuel tank pressure from the monitored fuel tank pressure; determine a duration of the refueling event; determine an amount of liquid fuel added based on the steady-state fuel tank pressure and further based on the duration of the refueling event; and indicating a fuel tank fill level following the refueling event based on a sum of the amount of fuel added and the fuel tank fill level prior to the refueling event. In this way, once a fuel tank fill level is established (for example, due to a full fuel tank indicated by an automatic shutoff event during refueling), the fuel tank fill level can be calculated in perpetuity despite the lack of a functioning fuel level indicator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

DETAILED DESCRIPTION

Figure 2A:
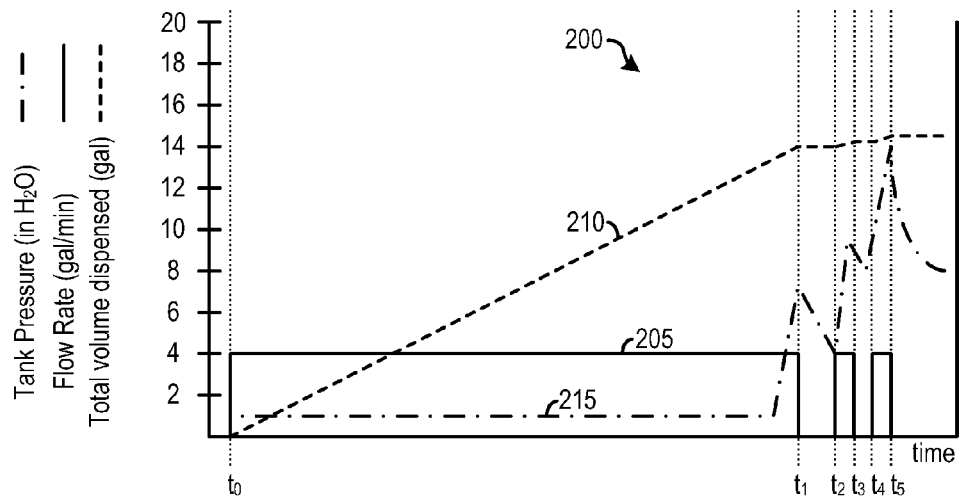
FIG. 2A shows an example timeline for a refueling event including a fuel dispensing rate of 4 gal/min.
Figure 2B:
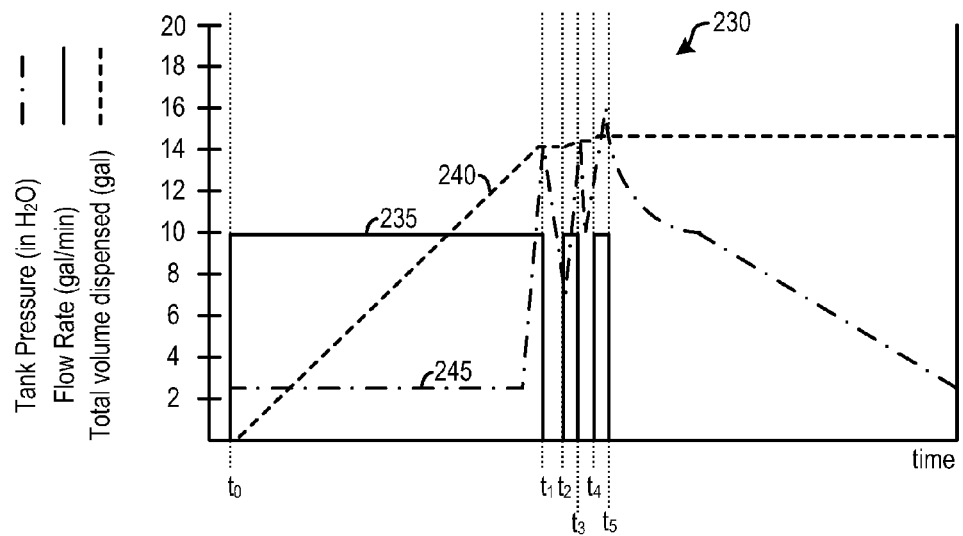
FIG. 2B shows an example timeline for a refueling event including a fuel dispensing rate of 10 gal/min.
Figure 2C:
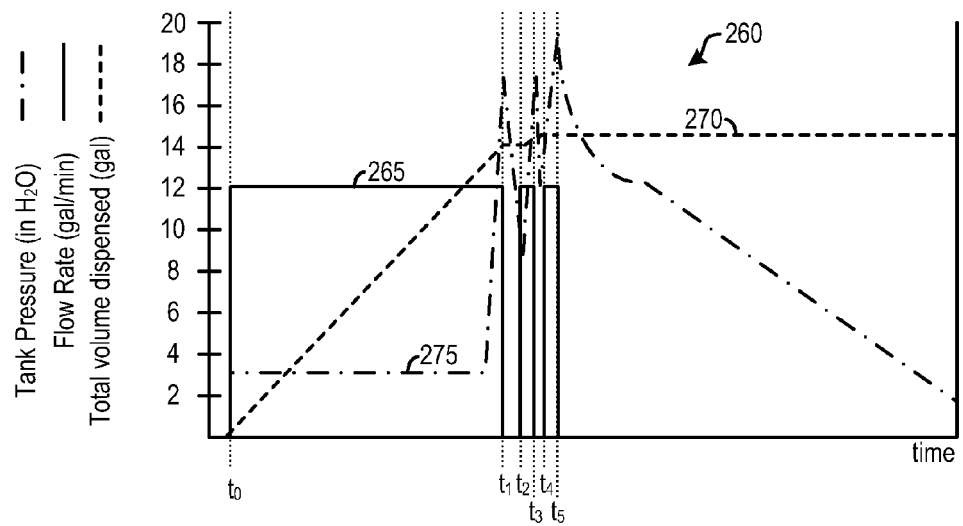
FIG. 2C shows an example timeline for a refueling event including a fuel dispensing rate of 12 gal/min.
Figure 3A:
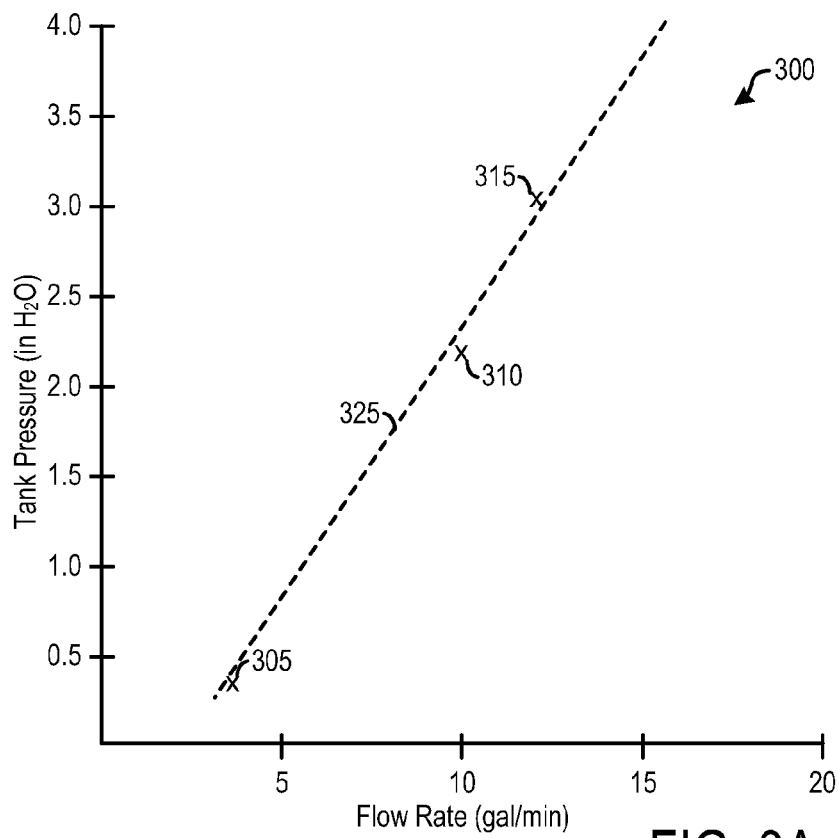
FIG. 3A shows a regression analysis plotting steady-state fuel tank pressure against a time-to-full duration.
Figure 3B:
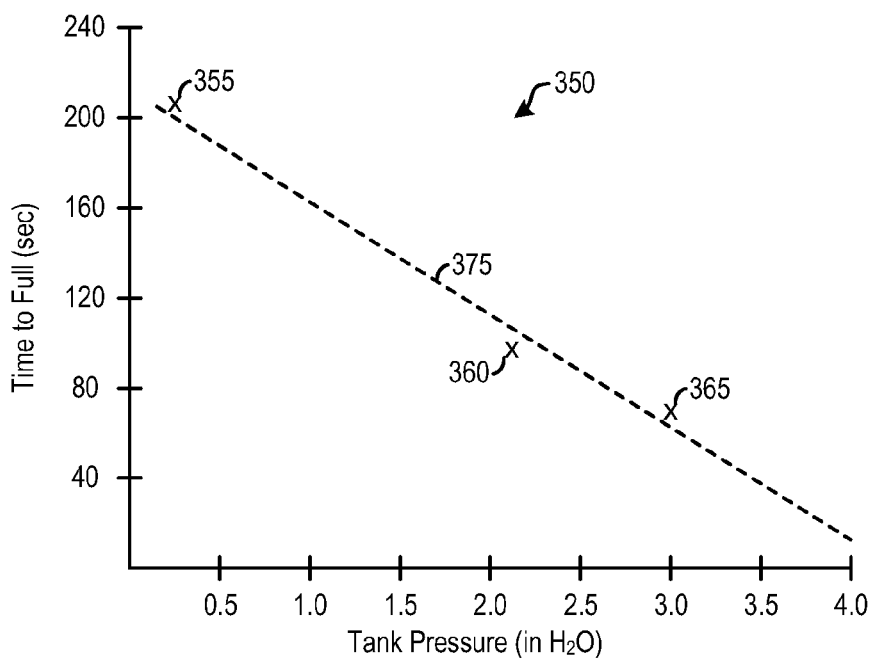
FIG. 3B shows a regression analysis plotting fuel flow rate against steady-state fuel tank pressure.

The following detailed description relates to systems and methods for determining a fuel fill level of a vehicle fuel tank. Specifically, the description entails means for using fuel tank pressure measurements during a refueling event as a basis for determining the amount of liquid fuel added to the fuel tank. The systems and methods may be implemented in a hybrid vehicle including a fuel system, such as the hybrid vehicle and fuel system depicted in FIG. 1. During a refueling event, the rate of fuel flow from a fuel dispenser may correlate with a steady-state fuel tank pressure during the refueling event. Timelines for example refueling events for different rates of fuel flow are depicted in FIGS. 2A-2C. FIG. 3A shows a linear regression between fuel flow rate and steady-state fuel tank pressure. FIG. 3B shows a linear regression between steady-state fuel tank pressure and a time-to-full duration. By monitoring the fuel tank pressure throughout a refueling event, the regression analysis can be used to determine the amount of fuel added to the fuel tank using a method such as the method depicted in FIG. 4. The total amount of fuel in the tank following the refueling event may be determined by summing the fuel added to the fuel level prior to the refueling event. FIG. 5 depicts a method for determining the fuel level prior to the refueling event.

Figure 1:
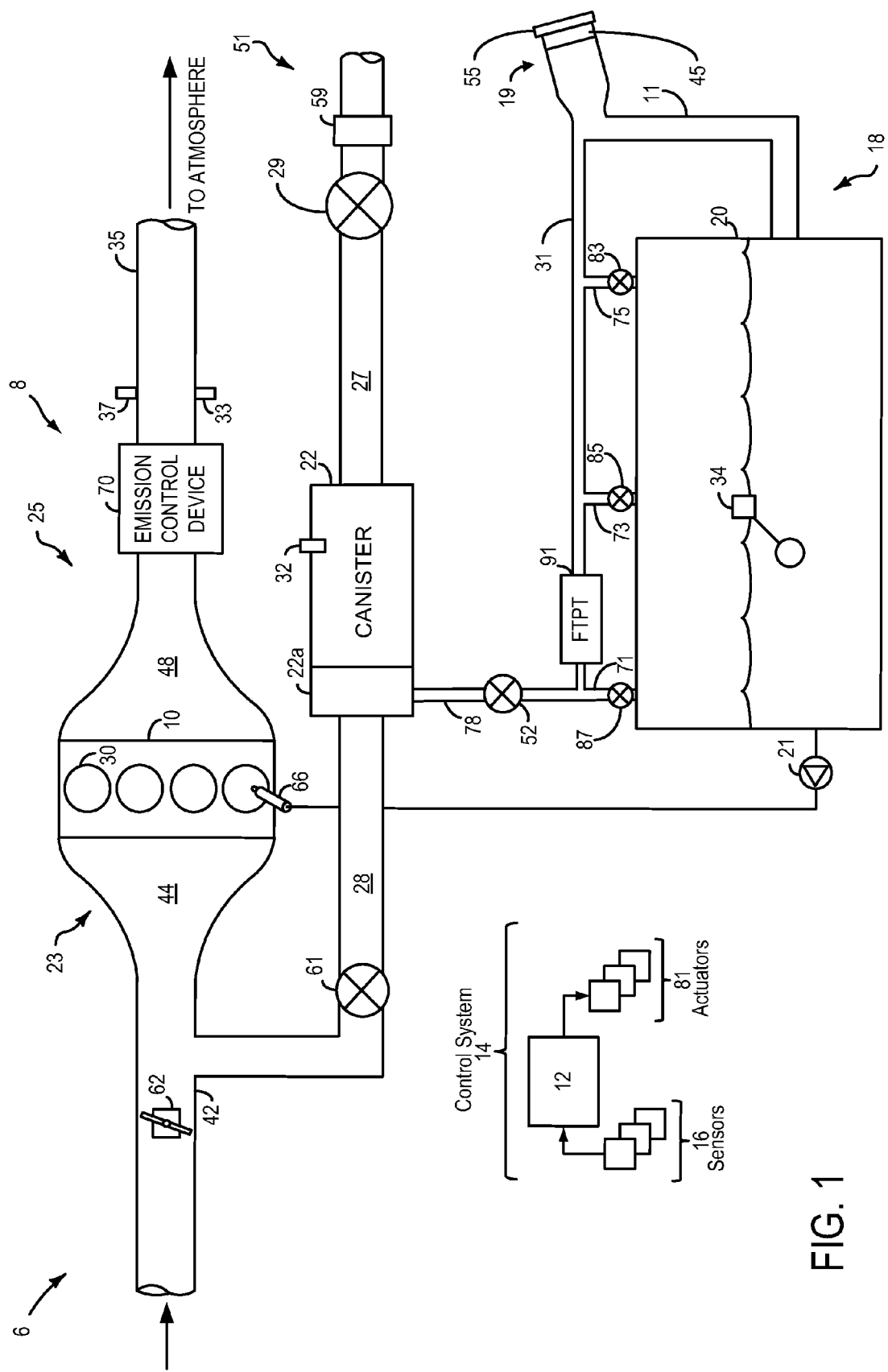
FIG. 1 shows a schematic depiction of a fuel system coupled to an engine system.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Vapors generated in fuel system 18 may be routed to an evaporative emissions control system 51 which includes a fuel vapor canister 22 via vapor recovery line 31, before being purged to the engine intake 23. Vapor recovery line 31 may be coupled to fuel tank 20 via one or more conduits and may include one or more valves for isolating the fuel tank during certain conditions. For example, vapor recovery line 31 may be coupled to fuel tank 20 via one or more or a combination of conduits 71, 73, and 75.

Further, in some examples, one or more fuel tank vent valves in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include a grade vent valve (GVV) 83. Further, in some examples, recovery line 31 may be coupled to a fuel filler system 19. In some examples, fuel filler system may include a fuel cap 55 for sealing off the fuel filler system from the atmosphere. Refueling system 19 is coupled to fuel tank 20 via a fuel filler pipe or neck 11.

Further, refueling system 19 may include refueling lock 45. In some embodiments, refueling lock 45 may be a fuel cap locking mechanism. The fuel cap locking mechanism may be configured to automatically lock the fuel cap in a closed position so that the fuel cap cannot be opened. For example, the fuel cap 55 may remain locked via refueling lock 45 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 45 may be a filler pipe valve located at a mouth of fuel filler pipe 11. In such embodiments, refueling lock 45 may not prevent the removal of fuel cap 55. Rather, refueling lock 45 may prevent the insertion of a refueling pump into fuel filler pipe 11. The filler pipe valve may be electrically locked, for example by a solenoid, or mechanically locked, for example by a pressure diaphragm.

In some embodiments, refueling lock 45 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 45 is locked using an electrical mechanism, refueling lock 45 may be unlocked by commands from controller 12, for example, when a fuel tank pressure decreases below a pressure threshold. In embodiments where refueling lock 45 is locked using a mechanical mechanism, refueling lock 45 may be unlocked via a pressure gradient, for example, when a fuel tank pressure decreases to atmospheric pressure.

Emissions control system 51 may include one or more emissions control devices, such as one or more fuel vapor canisters 22 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 51 may further include a canister ventilation path or vent line 27 which may route gases out of the canister 22 to the atmosphere when storing, or trapping, fuel vapors from fuel system 18.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 32 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 27 may also allow fresh air to be drawn into canister 22 when purging stored fuel vapors from fuel system 18 to engine intake 23 via purge line 28 and purge valve 61. For example, purge valve 61 may be normally closed but may be opened during certain conditions so that vacuum from engine intake manifold 44 is provided to the fuel vapor canister for purging. In some examples, vent line 27 may include an air filter 59 disposed therein upstream of a canister 22.

Flow of air and vapors between canister 22 and the atmosphere may be regulated by a canister vent valve 29. In some embodiments, such as in hybrid-electric vehicles, fuel tank 20 may be coupled to canister 22 via fuel tank isolation valve (FTIV) 52. Canister vent valve 29 may be a normally open valve, so that FTIV 52 may control venting of fuel tank 20 with the atmosphere. FTIV 52 may be positioned between the fuel tank and the fuel vapor canister within conduit 78. FTIV 52 may be a normally closed valve, that when opened, allows for the venting of fuel vapors from fuel tank 20 to canister 22. Fuel vapors may then be vented to atmosphere via canister vent valve 29, or purged to engine intake system 23 via canister purge valve 61.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 52 and canister vent valve 29 while closing canister purge valve (CPV) 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 52 and canister vent valve 29, while maintaining canister purge valve 61 closed, to depressurize the fuel tank before allowing enabling fuel to be added therein. As such, isolation valve 52 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 61 and canister vent valve 29 while closing isolation valve 52. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, temperature sensor 33, pressure sensor 91, and canister temperature sensor 43. Other sensors such as pressure, temperature, air/fuel ratio, and composition sensors may be coupled to various locations in the vehicle system 6. As another example, the actuators may include fuel injector 66, throttle 62, fuel tank isolation valve 53, pump 92, and refueling lock 45. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-4.

Leak detection routines may be intermittently performed by controller 12 on fuel system 18 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum.

In most vehicles, the output of fuel level sensor 34 is communicatively coupled to an in dash fuel level indicator via controller 12. However, many types of fuel level sensor are prone to sticking or otherwise losing functionality. In such a scenario, the vehicle operator may be left with no indication (or a false indication) of the amount of fuel left in the fuel tank. This, in turn, may lead the vehicle running out of fuel unexpectedly. However, the inventors herein have recognized that existing fuel system hardware may be utilized to infer the fuel fill level as an alternative to, or in addition to the fuel fill level as determined by the dedicated fuel level sensor. As liquid fuel is dispensed into a fuel tank, some of the fuel will volatize into fuel vapor. The pressure of the fuel vapor in the tank is proportional to the rate of liquid fuel flow from the fuel dispenser into the fuel tank. Thus, the fuel tank pressure transducer may be utilized to determine the fuel flow rate, and hence the amount of fuel added during the refueling event.

FIGS. 2A-2C show example timelines for refueling events in accordance with the current disclosure. FIG. 2A depicts example timeline 200. Timeline 200 includes plot 205, depicting the flow rate of a liquid fuel (in gallons/min) from a fuel dispenser into a fuel tank over time. Timeline 200 further includes plot 210, showing the total volume of fuel dispensed (in gallons) into the fuel tank over time. Timeline 200 further includes plot 215, depicting fuel tank pressure (in $H_2O$) over time.

At time $t_0$, a refueling event begins. The fuel dispenser in this example dispenses liquid fuel at a rate of 4 gallons/min, as shown by plot 205. The amount of fuel in the tank increases accordingly, as shown by plot 210. As shown by plot 215, the fuel tank pressure during the refueling event (as determined through a fuel tank pressure transducer) is approximately 0.3 in $H_2O$ during the steady-state period from time $t_0$ to just prior to time $t_1$.

At time $t_1$, the fuel tank reaches a predetermined full fill level, as shown by plot 210. Approaching the full fill level causes the fuel tank pressure to rise, as shown by plot 215. The rise in fuel tank pressure causes an automatic shut-off signal to be sent to the fuel dispenser. Accordingly, the fuel dispenser is shut off at time $t_1$, and fuel dispensing ceases, as shown by plot 205.

From time $t_2$ to time $t_3$, the fuel dispenser operator attempts to trickle-fill additional fuel in the fuel tank, as shown by plot 205. Accordingly, fuel tank pressure increases, as shown by plot 215, although a minimal amount of fuel is added to the tank, as shown by plot 210. At time $t_3$, another automatic shut-off event occurs. As such, the fuel tank dispenser is shut off, as shown by plot 205, and fuel tank pressure decreases, as shown by plot 215. Another trickle-filling event followed by an automatic shut-off event occurs from time $t_4$ to time $t_5$. Following time $t_5$, the fuel tank pressure decreases, as shown by plot 215. The refueling event is then finalized.

FIG. 2B depicts example timeline 230. Timeline 230 includes plot 235, depicting the flow rate of liquid fuel (in gallons/min) from a fuel dispenser into a fuel tank over time. Timeline 230 further includes plot 240, showing the total volume of fuel dispensed (in gallons) into the fuel tank over time. Timeline 230 further includes plot 245, depicting fuel tank pressure (in $H_2O$) over time. Timeline 230 assumes the same operating parameters as timeline 200.

At time $t_0$, a refueling event begins. The fuel dispenser in this example dispenses liquid fuel at a rate of 10 gallons/min, as shown by plot 235. The amount of fuel in the tank increases accordingly, as shown by plot 240. In this example, the slope of plot 240 is greater than the slope of plot 210 as depicted in FIG. 2A. As shown by plot 245, the fuel tank pressure during the refueling event (as determined through a fuel tank pressure transducer) is approximately 2.2 in $H_2O$ during the steady-state period from time $t_0$ to just prior to time $t_1$.

At time $t_1$, the fuel tank reaches a predetermined full fill level, as shown by plot 240. Approaching the full fill level causes the fuel tank pressure to rise, as shown by plot 245. The rise in fuel tank pressure causes an automatic shut-off signal to be sent to the fuel dispenser. Accordingly, the fuel dispenser is shut off at time $t_1$, and fuel dispensing ceases, as shown by plot 235. The time-to-full (from time $t_0$ to time $t_1$) is shorter than for the 4 gal/min dispenser depicted in FIG. 2A.

From time $t_2$ to time $t_3$, the fuel dispenser operator attempts to trickle-fill additional fuel in the fuel tank, as shown by plot 235. Accordingly, fuel tank pressure increases, as shown by plot 245, although a minimal amount of fuel is added to the tank, as shown by plot 240. At time $t_3$, another automatic shut-off event occurs. As such, the fuel tank dispenser is shut off, as shown by plot 235, and fuel tank pressure decreases, as shown by plot 245. Another trickle-filling event followed by an automatic shut-off event occurs from time $t_4$ to time $t_5$. Following time $t_5$, the fuel tank pressure decreases, as shown by plot 245. The refueling event is then finalized.

FIG. 2C depicts example timeline 260. Timeline 260 includes plot 265, depicting the flow rate of liquid fuel (in gallons/min) from a fuel dispenser into a fuel tank over time. Timeline 260 further includes plot 270, showing the total volume of fuel dispensed (in gallons) into the fuel tank over time. Timeline 260 further includes plot 275, depicting fuel tank pressure (in $H_2O$) over time. Timeline 260 assumes the same operating parameters as timelines 200 and 230.

At time $t_0$, a refueling event begins. The fuel dispenser in this example dispenses liquid fuel at a rate of 12 gallons/min, as shown by plot 265. The amount of fuel in the tank increases accordingly, as shown by plot 270. In this example, the slope of plot 270 is greater than the slopes of plots 210 and 240 as depicted in FIGS. 2A and 2B. As shown by plot 275, the fuel tank pressure during the refueling event (as determined through a fuel tank pressure transducer) is approximately 3.0 in $H_2O$ during the steady-state period from time $t_0$ to just prior to time $t_1$.

At time $t_1$, the fuel tank reaches a predetermined full fill level, as shown by plot 270. Approaching the full fill level causes the fuel tank pressure to rise, as shown by plot 275. The rise in fuel tank pressure causes an automatic shut-off signal to be sent to the fuel dispenser. Accordingly, the fuel dispenser is shut off at time $t_1$, and fuel dispensing ceases, as shown by plot 265. The time-to-full (from time $t_0$ to time $t_1$) is shorter than for the 4 gal/min dispenser depicted in FIG. 2A or than for the 10 gal/min dispenser depicted in FIG. 2B.

From time $t_2$ to time $t_3$, the fuel dispenser operator attempts to trickle-fill additional fuel in the fuel tank, as shown by plot 265. Accordingly, fuel tank pressure increases, as shown by plot 245, although a minimal amount of fuel is added to the tank, as shown by plot 240. At time $t_3$, another automatic shut-off event occurs. As such, the fuel tank dispenser is shut off, as shown by plot 265, and fuel tank pressure decreases, as shown by plot 275. Another trickle-filling event followed by an automatic shut-off event occurs from time $t_4$ to time $t_5$. Following time $t_5$, the fuel tank pressure decreases, as shown by plot 275. The refueling event is then finalized.

For a particular fuel tank, the steady-state fuel tank pressure during refueling may be indicative of the flow rate of the fuel dispenser. FIG. 3A depicts an example plot 300 indicating a linear regression between steady-state fuel tank pressure (in $H_2O$) and fuel flow rate (in gal/min). Plot 300 includes plot point 305, depicting the steady-state tank pressure and fuel flow rate for the 4 gal/min fuel dispenser described with regards to FIG. 2A. Plot 300 further includes plot point 310, depicting the steady-state tank pressure and fuel flow rate for the 10 gal/min fuel dispenser described with regards to FIG. 2B, and further includes plot point 315, depicting the steady-state tank pressure and fuel flow rate for the 12 gal/min fuel dispenser described with regards to FIG. 2C. Regression line 325 represents the relationship between steady-state tank pressure and fuel flow rate for an example fuel tank. During (or following) a refueling event, the steady-state pressure may be determined via the fuel tank pressure transducer, and the pressure then used to determine the fuel flow rate via an equation or lookup table stored in the vehicle controller.

For this example fuel tank, the steady-state tank pressure and time-to-full values may thus be indicative of the fuel dispensing rate, and hence the amount of fuel added to the fuel tank during a refueling event. FIG. 3B depicts an example plot 350 indicating a regression between time-to-full (in seconds) and tank pressure (in $H_2O$). Plot 350 includes plot point 355, depicting the steady-state tank pressure and time-to-full duration for the 4 gal/min fuel dispenser described with regards to FIG. 2A. Plot 350 further includes plot point 360, depicting the steady-state tank pressure and time-to-full duration for the 10 gal/min fuel dispenser described with regards to FIG. 2B, and further includes plot point 365, depicting the steady-state tank pressure and time-to-full duration for the 12 gal/min fuel dispenser described with regards to FIG. 2C. Regression line 375 represents the relationship between steady-state tank pressure and time to fill for an example fuel tank. During (or following) a refueling event, the steady-state pressure may be determined via the fuel tank pressure transducer, and the pressure then used to determine the time-to-full duration via an equation or lookup table stored in the vehicle controller. The duration of the steady-state tank pressure may then be used to determine the amount of fuel dispensed (as a percentage of a full tank).

For example, using regression line 375, a steady-state tank pressure of 1.0 in $H_2O$ corresponds with a time-to-full duration of 167 seconds. If the steady-state tank pressure duration is 100 seconds, the amount of dispensed fuel may be estimated as [100/167]*100=59.8% of fuel tank capacity. If the steady-state tank pressure duration is 167 seconds or greater, the tank may be assumed to be filled to 100% of fuel tank capacity.

Figure 4:
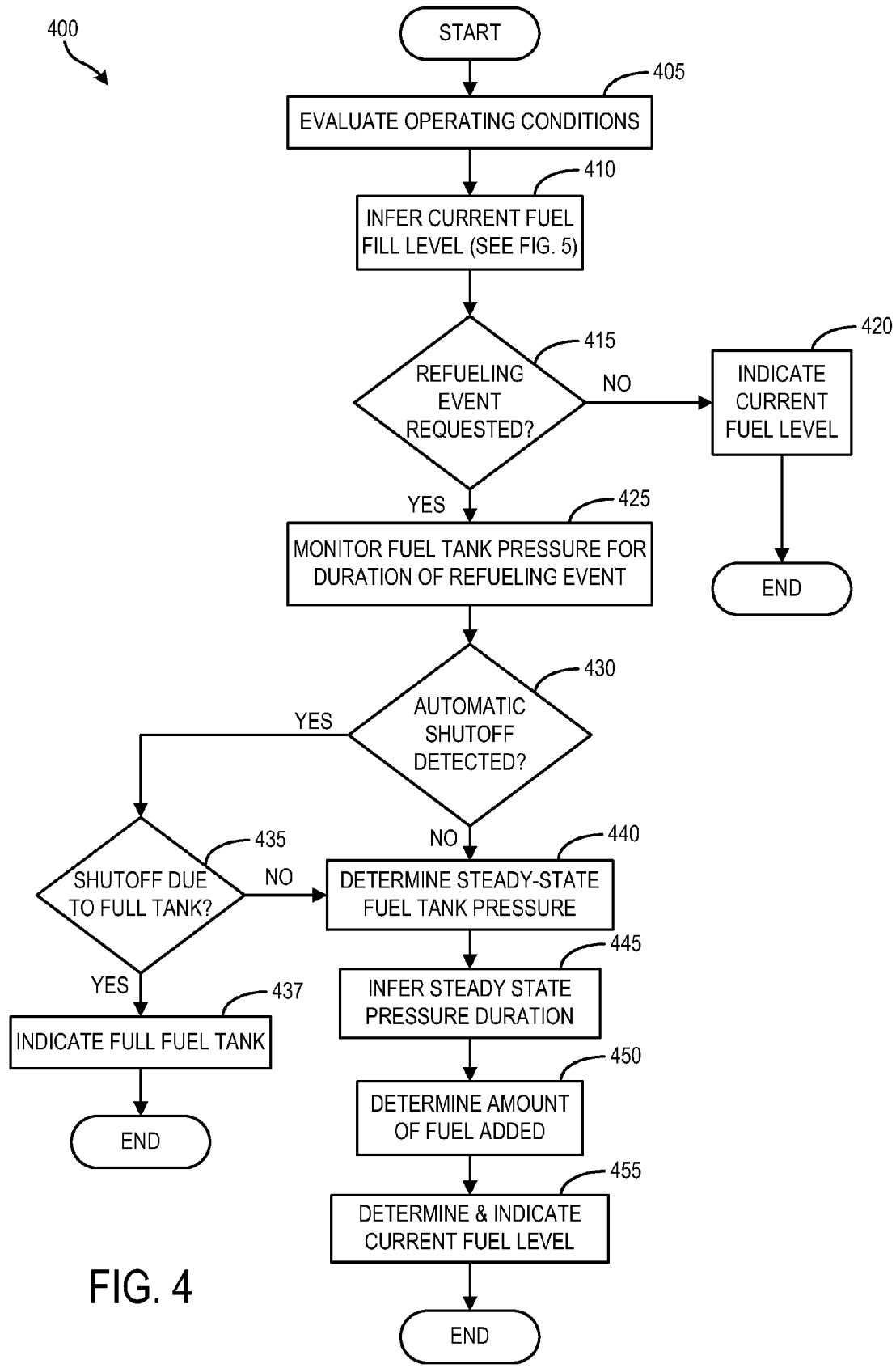
FIG. 4 shows an example method for determining an amount of fuel added during a refueling event.
Figure 5:
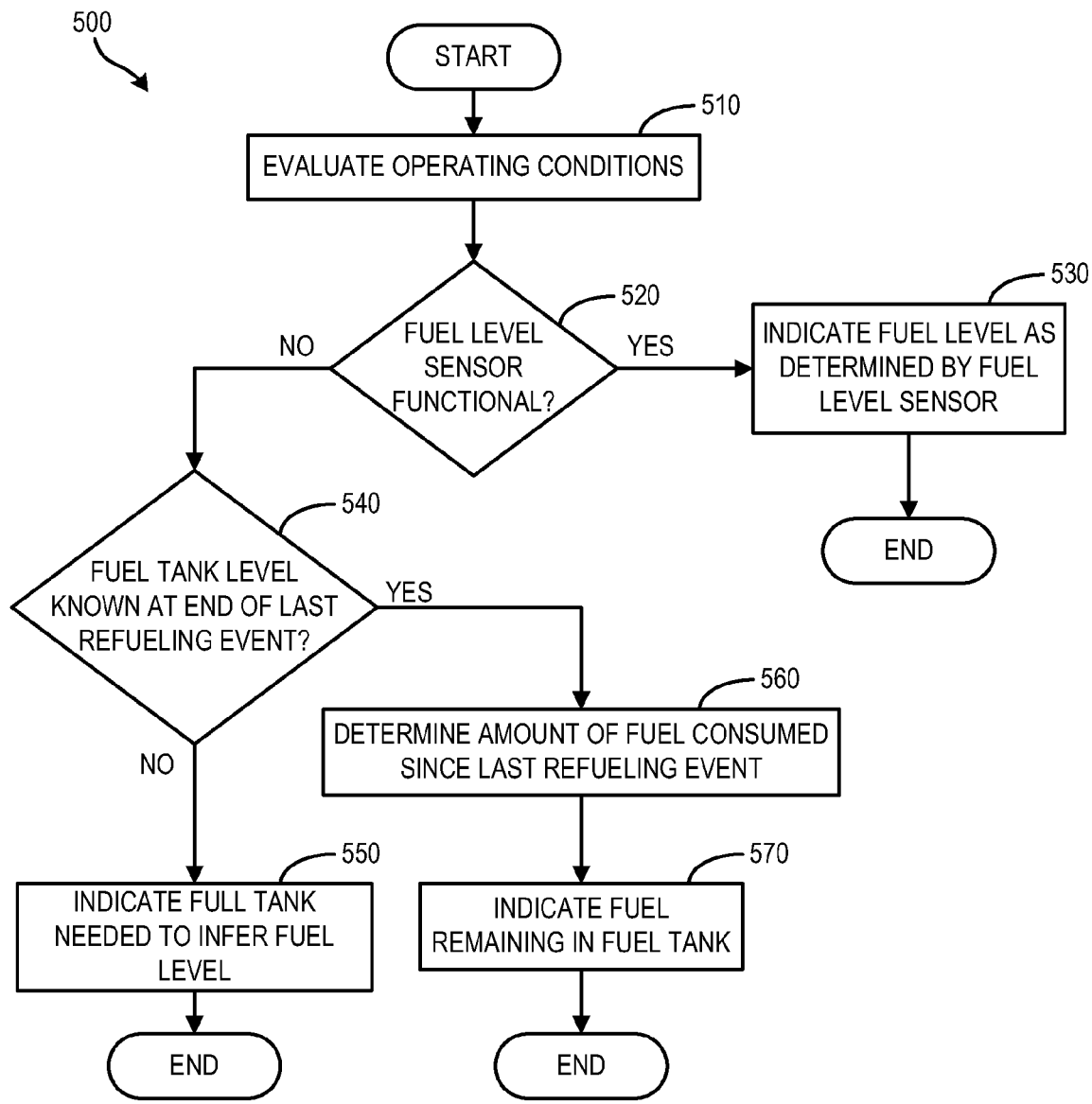
FIG. 5 shows an example method for determining a fuel tank fill level.

FIG. 4 depicts an example method 400 for determining a fuel tank fill level. In particular, method 400 relates to determining the fuel tank fill level based on a fuel tank pressure during a refueling event. Method 400 may be utilized to determine the amount of liquid fuel added to a fuel tank from a liquid fuel dispenser during a refueling event. Method 400 will be described herein with reference to the components and systems depicted in FIG. 1, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, fuel tank pressure, ambient temperature, engine operating status, vehicle location (as determined through an on-board GPS, for example), etc. Operating conditions may be measured by one or more sensors 16 coupled to controller 12, or may be estimated or inferred based on available data. Continuing at 410, method 400 may include inferring the current fuel fill level. A more detailed sub-routine for inferring current fuel fill level is described further herein and depicted in FIG. 5.

Continuing at 415, method 400 may include determining whether a refueling event has been requested. For example, hybrid vehicle 6 may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In other examples, a refueling event may be inferred by the vehicle operator (or a refueling attendant) opening a refueling door or otherwise attempting to gain access to fuel filler system 19.

If no refueling event has been requested, method 400 may proceed to 420. At 420, method 400 may include indicating the current fuel level as determined at 410. If a refueling event has been requested, method 400 may proceed to 425. At 425, method 400 may include monitoring a fuel tank pressure for the duration of the refueling event. Fuel tank pressure may be monitored by one or more fuel tank pressure sensors, such as FTPT 91, and stored in controller 12.

At 430, method 400 may include determining whether an automatic shut-off event has been detected. An automatic shut-off event may be indicated by controller 12, and/or by the refueling dispenser based on fuel tank fill level, fuel tank pressure, etc. If an automatic-shutoff event has been detected, method 400 may proceed to 435. At 435, method 400 may include determining whether the automatic shut-off event was due to a full fuel tank. If the automatic shut-off event was due to a full fuel tank, method 400 may proceed to 437. At 437, method 400 may include indicating a full fuel tank. Indicating a full fuel tank may include recording a full fuel tank at controller 12, and may further include indicating a full fuel tank at a dash mounted fuel level indicator. Method 400 may then end.

If no automatic shut-off event is detected, or if an automatic shut-off event is detected and determined to not be the result of a full fuel tank, method 400 may proceed to 440. At 440, method 400 may include determining the steady-state fuel tank pressure during the refueling event. The steady-state fuel tank pressure may then be used to determine the fuel dispensing flow rate and/or the expected time-to-full duration, as described herein and depicted in FIGS. 3A and 3B. Continuing at 445, method 400 may include inferring the duration of the steady-state tank pressure, or otherwise determining the amount of time during which fuel was added to the fuel tank.

Continuing at 450, method 400 may include determining the amount of fuel added to the fuel tank during the refueling event. Determining the amount of fuel added to the fuel tank during the refueling event may include determining the amount of fuel added to the fuel tank based on the fuel tank steady-state pressure during refueling. The amount of fuel added may further be based on the duration of the steady-state pressure during the refueling event. The duration of the steady-state pressure may be indicated by an initial pressure change and a final pressure change. The initial pressure change may be a based on an increase of pressure, indicating an influx of liquid fuel into the fuel tank, and/or may be based on a decrease in pressure following an initial increase in pressure. For example, the initiation of a refueling event may cause an immediate pressure spike above the steady-state pressure. The final pressure change may be a decrease in pressure from the steady-state pressure, (e.g. cessation of fuel dispensation) or may be an increase in pressure from the steady-state pressure (e.g. approaching a full fill level). As such, the controller may determine the amount of fuel added based on an integration of the fuel flow rate over the duration of the steady-state pressure. The controller may determine the amount of fuel added based on a ratio of the duration of the steady-state pressure to the estimated time-to-full duration. Look-up tables or algorithms for determining the amount of fuel added may be stored at the controller in non-transitory memory. Determining the amount of fuel added to the fuel tank may not include determining the fuel level based on a dedicated fuel level sensor.

Continuing at 455, method 400 may include determining and indicating the current fuel level. Determining the current fuel level may include determining the sum of the amount of fuel added during the refueling event (as described at 450) and the amount of fuel in the fuel tank prior to the refueling event (as described at 410 and further herein with regards to FIG. 5). Indicating the current fuel level may include recording the fuel level at controller 12, and may further include indicating the fuel level at a dash mounted fuel level indicator. Method 400 may then end.

FIG. 5 depicts an example method 500 for inferring a current fuel fill level. In particular, method 500 is directed towards determining the fuel fill level prior to a refueling event, but it should be recognized that method 500 or similar methods may be applied at any point in vehicle operation without departing from the scope of this disclosure. Method 500 may be run as a stand-alone routine, or as a subroutine for another method, such as method 400. Method 500 will be described herein with reference to the components and systems depicted in FIG. 1, though it should be understood that the method may be applied to other systems without departing from the scope of this disclosure. Method 500 may be carried out by controller 12, and may be stored as executable instructions in non-transitory memory.

Method 500 may begin at 510. At 510, method 500 may include evaluating operating conditions. Operating conditions may include, but are not limited to, fuel tank pressure, ambient temperature, engine operating status, vehicle location (as determined through an on-board GPS, for example), etc. Operating conditions may be measured by one or more sensors 16 coupled to controller 12, or may be estimated or inferred based on available data.

Continuing at 520, method 500 may include determining whether the fuel level sensor (e.g. fuel level sensor 34) is functional. Determining whether the fuel level sensor is function may include accessing information related to a recent fuel level sensor test, accessing information related to malfunction codes associated with the fuel level sensor, actively testing the sensor, or otherwise inferring the functionality of the fuel level sensor. If the fuel level sensor is determined to be functional, method 500 may proceed to 530. At 530, method 500 may include indicating the fuel level as determined by the fuel level sensor. The fuel level may be recorded by controller 12, and may be indicated on an in-dash fuel level indicator.

If the fuel level sensor is determined to be non-functional or indeterminate, method 500 may proceed to 540. At 540, method 500 may include determining whether the fuel tank fill level was known at the end of the last refueling event. The fuel tank fill level at the end of the last refueling event may have been determined by a previously functional fuel level sensor, a fuel level algorithm (such as method 400), or via the detection of an automatic-shut off event due to a full fuel tank.

If the fuel tank level was not known at the end of the last refueling event, method 500 may proceed to 550. At 550, method 500 may include indicating that the fuel tank must be filled in order to infer the fuel level going forward. Indicating the need for a full fuel tank may include communicating with the vehicle operator via an in-dash messaging system, via a communication sent to the vehicle operator's phone, etc. Method 500 may then end.

If the fuel tank level was known at the end of the last refueling event, method 500 may proceed to 560. At 560, method 500 may include determining the amount of fuel consumed since the last refueling event. Determining the amount of fuel consumed since the last refueling event may include, for example, summing the amount of fuel injected into engine 10 over vehicle operation since the completion of the last refueling event. Continuing at 570, method 500 may include determining and indicating the amount of fuel remaining in the fuel tank. Determining the amount of fuel remaining in the fuel tank may include subtracting the amount of fuel consumed since the last refueling event from the amount of fuel in the fuel tank at the end of the last refueling event. An indication of the amount of fuel remaining in the fuel tank may be recorded by controller 12, and may further be indicated on an in-dash fuel level indicator. Method 500 may then end.

The inferred fuel tank fill level may be utilized by controller 12 in downstream calculations that would typically be based on a measurement from the fuel level indicator. For example, the fuel level may be used in the calculation of a miles-to-empty parameter that may be displayed to the vehicle operator on an in-dash indicator. In scenarios where the fuel tank is trickle-filled above the maximum fill level, the controller may utilize the inferred fuel tank fill level even if the fuel level indicator as functional. In other words, if the inferred fuel tank fill level is above 100% of the maximum fill level, miles-to-empty parameter may be calculated based on the inferred fuel fill level. In this way, the miles-to-empty parameter may be calculated with increased accuracy.

The inferred fuel fill level may also be used as a parameter for confirming or disconfirming a fuel level indicator malfunction code. For example, if the fuel tank is trickle-filled above the maximum fill level, the fuel level indicator may indicate a 100% fill level for an extended duration, which may give a diagnostics test the impression that the fuel level indicator is stuck, when it is, in fact, functional. For example, a diagnostic routine to determine whether the fuel level indicator is stuck in range (e.g. stuck at the maximum "full" level) based on the indicated level not changing after a threshold level of miles driven by the vehicle. The diagnostic routine may wait until a threshold level (e.g., 100 miles) driven and if the indicated fuel level does not decrease by a corresponding threshold, indicate degradation. If trickle fuel is detected as described above herein, the threshold number of miles may be correspondingly increased and used in the diagnostic. In one example, prior to setting a malfunction code, the controller may access the inferred fuel tank fill level to determine if the fuel tank fill level is greater than or equal to 100% of the maximum fill level. A malfunction code would thus only be set if the fuel level indicator was truly stuck, and not if the fuel tank fill level was determined to be at or above the maximum fill level.

The system described herein and depicted in FIG. 1 along with the methods described herein and depicted in FIGS. 3 and 4 may enable one or more systems and one or more methods. In one example, a method, comprising: indicating a fuel level of a fuel tank based on a steady-state fuel tank pressure during a refueling event. The fuel level may be a liquid fuel level. The fuel level of the fuel tank may be further based on a duration of the refueling event. The fuel flow rate may be determined based on the steady-state fuel tank pressure. The fuel flow rate may be a liquid fuel flow rate. A time-to-full duration may be determined based on the steady-state fuel tank pressure. The fuel level of the fuel tank may be further based on a residual fuel level determined prior to commencement of the refueling event. The residual fuel level may be determined based on an amount of fuel consumed following a full-tank event. The technical result of implementing this method is that an amount of fuel added to a fuel tank may be determined based on measured conditions during the refueling event, whether or not the fuel level indicator is functional. Once a fuel tank fill level is established, the fill level may be continuously updated based on fuel consumed and fuel added.

A method for a fuel system, comprising: monitoring a fuel tank pressure during a refueling event; determining a fuel flow rate based on a steady-state portion of the monitored fuel tank pressure; and indicating an amount of fuel added to a fuel tank based on the fuel flow rate. The method may further comprise: determining an initial fuel tank fill level prior to a refueling event; and indicating a fuel tank fill level based on a sum of the initial fuel tank fill level and the amount of fuel added. Determining an amount of fuel added may include integrating the fuel flow rate over a duration of the refueling event. The duration of the refueling event may be determined by an initial pressure change and a final pressure change. The final pressure change may include an increase in fuel pressure above the steady-state portion of the monitored fuel tank pressure. Determining an initial fuel tank fill level prior to a refueling event may further comprise: determining a fuel tank fill level following a previous refueling event; and determining an amount of fuel consumed following the previous refueling event. The method may further comprise: indicating a user to fill the fuel tank when the fuel tank fill level following the previous refueling event is indeterminate. The technical result of implementing this method is that an accurate fuel tank fill level may be indicated to a user even if the fuel fill level indicator is malfunctioning. In turn, this may help the vehicle operator to better plan driving routes and fill station stops, without running out of fuel due to misinformation, and without the anxiety that comes with worrying about running out of fuel.

In yet another example, a fuel system for a vehicle, comprising: a fuel tank configured to receive and store a liquid fuel; a fuel tank pressure sensor coupled to the fuel tank; and a controller configured with instructions stored in non-transitory memory, that when executed, cause the controller to: determine a fuel tank fill level prior to a refueling event; monitor a fuel tank pressure during a refueling event; determine a steady-state fuel tank pressure from the monitored fuel tank pressure; determine a duration of the refueling event; determine an amount of liquid fuel added based on the steady-state fuel tank pressure and further based on the duration of the refueling event; and indicating a fuel tank fill level following the refueling event based on a sum of the amount of fuel added and the fuel tank fill level prior to the refueling event. The controller may further comprise: lookup tables stored in non-transitory memory for determining a fuel flow rate based on the steady-state fuel tank pressure. The controller may further comprise: lookup tables stored in non-transitory memory for determining a time-to-full duration based on the steady-state fuel tank pressure. The controller is further configured with instructions stored in non-transitory memory, that when executed, cause the controller to: indicate a full fuel tank based on an automatic shut-off event. The fuel tank may not comprise a functional fuel tank fill level sensor. The technical result of implementing this system is a secondary method for determining a fuel tank fill level. In this way, a malfunctioning fuel level indicator may be diagnosed prior to misinformation being delivered to the vehicle user. A correct fuel level may thus always be supplied to an in-dash fuel level indicator.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    before a refueling event, opening an isolation tank valve and a canister vent valve via respective actuators;
    maintaining the isolation tank valve and the canister vent valve open during the refueling event; and
    indicating, to a vehicle operator, a fuel level of a fuel tank based on a steady-state fuel tank pressure during the refueling event.

2. The method of claim 1, where the fuel level is a liquid fuel level.

3. The method of claim 2, where the fuel level of the fuel tank is further based on a duration of the refueling event.

4. The method of claim 3, wherein a time-to-full duration is determined based on the steady-state fuel tank pressure.

5. The method of claim 2, wherein a fuel flow rate is determined based on the steady-state fuel tank pressure.

6. The method of claim 5, wherein the fuel flow rate is a liquid fuel flow rate.

7. The method of claim 1, wherein the fuel level of the fuel tank is further based on a residual fuel level determined prior to commencement of the refueling event.

8. The method of claim 7, where the residual fuel level is determined based on an amount of fuel consumed following a full-tank event.

9. A method for a fuel system, comprising:
    monitoring a fuel tank pressure during a refueling event via a sensor;
    determining a fuel flow rate based on a steady-state portion of the monitored fuel tank pressure;
    indicating an amount of fuel added to a fuel tank based on the fuel flow rate;
    determining an initial fuel tank fill level prior to the refueling event; and
    indicating to an operator a fuel tank fill level based on a sum of the initial fuel tank fill level and the amount of fuel added.

10. The method of claim 9, where determining the amount of fuel added includes integrating the fuel flow rate over a duration of the refueling event.

11. The method of claim 10, where the duration of the refueling event is determined by an initial pressure change and a final pressure change.

12. The method of claim 11, where the final pressure change includes an increase in fuel pressure above the steady-state portion of the monitored fuel tank pressure.

13. The method of claim 9, where determining the initial fuel tank fill level prior to the refueling event further comprises:
    determining the fuel tank fill level following a previous refueling event; and
    determining an amount of fuel consumed following the previous refueling event.

14. The method of claim 13, further comprising:
    indicating a user to fill the fuel tank when the fuel tank fill level following the previous refueling event is indeterminate.

15. A fuel system for a vehicle, comprising:
    a fuel tank configured to receive and store a liquid fuel;
    a fuel tank pressure sensor coupled to the fuel tank; and
    a controller configured with instructions stored in non-transitory memory, that when executed, cause the controller to:
        determine a fuel tank fill level prior to a refueling event;
        monitor a fuel tank pressure during the refueling event;
        determine a steady-state fuel tank pressure from the monitored fuel tank pressure;

determine a duration of the refueling event;

determine an amount of liquid fuel added based on the steady-state fuel tank pressure and further based on the duration of the refueling event; and indicate to an operator a fuel tank fill level following the refueling event based on a sum of the amount of liquid fuel added and the fuel tank fill level prior to the refueling event.

16. The fuel system of claim 15, where the controller further comprises:

lookup tables stored in non-transitory memory for determining a fuel flow rate based on the steady-state fuel tank pressure.

17. The fuel system of claim 15, where the controller further comprises:

lookup tables stored in non-transitory memory for determining a time-to-full duration based on the steady-state fuel tank pressure.

18. The fuel system of claim 15, where the controller is further configured with instructions stored in non-transitory memory, that when executed, cause the controller to:

indicate a full fuel tank based on an automatic shut-off event.

* * * * *